United States Patent
Chien et al.

(10) Patent No.: US 7,812,919 B2
(45) Date of Patent: Oct. 12, 2010

(54) CHOLESTERIC LIQUID CRYSTAL LIGHT MODULATORS

(75) Inventors: Liang-Chy Chien, Hudson, OH (US); Shin-Ying Lu, Kent, OH (US)

(73) Assignee: Kent State University, Kent, OH (US)

( * ) Notice: Subject to any disclaimer, the term of this patent is extended or adjusted under 35 U.S.C. 154(b) by 150 days.

(21) Appl. No.: 11/825,776

(22) Filed: Jul. 9, 2007

(65) Prior Publication Data
US 2008/0030635 A1 Feb. 7, 2008

Related U.S. Application Data

(60) Provisional application No. 60/836,093, filed on Aug. 7, 2006, provisional application No. 60/836,094, filed on Aug. 7, 2006.

(51) Int. Cl.
G02F 1/13 (2006.01)
(52) U.S. Cl. .......................... 349/176; 349/33; 349/188
(58) Field of Classification Search ................. 349/175, 349/176, 33, 188, 191; 359/105, 103; 252/299.01
See application file for complete search history.

(56) References Cited

U.S. PATENT DOCUMENTS

| 5,437,811 | A | 8/1995 | Doane et al. |
|---|---|---|---|
| 5,668,614 | A | 9/1997 | Chien et al. |
| 5,691,795 | A | 11/1997 | Doane et al. |
| 5,695,682 | A | 12/1997 | Doane et al. |
| 6,540,938 | B1 * | 4/2003 | Afzali-Arkadani et al. ..................... 252/299.01 |
| 6,630,982 | B2 | 10/2003 | Li |
| 6,654,080 | B1 | 11/2003 | Khan et al. |
| 2004/0031672 | A1 * | 2/2004 | Wen ........................... 200/512 |
| 2006/0082564 | A1 * | 4/2006 | Poliankine et al. .......... 345/204 |
| 2007/0221921 | A1 * | 9/2007 | Takezoe et al. ............... 257/53 |
| 2008/0165097 | A1 * | 7/2008 | Coates et al. ................. 345/87 |

OTHER PUBLICATIONS

Haiqing Xianyu, Tsung-Hsien Lin and Shin-Tson Wu, "Rollable multicolor display using electrically induced blueshift of a cholesteric reactive mesogen mixture", *Applied Physics Letters* 89, pp. 091124-1-091124-3 (2006) American Institute of Physics.

Haiqing Xianyu, Tsung-Hsien Lin and Shin-Tson Wu "Rollable Reflective Multicolor Cholesteric Displays" Proc. 26, International Display Research Conference 2006, pp. 28-31 (Kent, Ohio, Sep. 18-21, 2006).

* cited by examiner

*Primary Examiner*—Ellen Kim
(74) *Attorney, Agent, or Firm*—Fay Sharpe LLP

(57) ABSTRACT

This invention relates to a method of fabrication of liquid crystal light modulating devises having electrically tunable spectral wavelength and more particularly, to a cholesteric liquid crystal display with electrically switchable colors. The cholesteric light modulators may be fabricated by applying a plurality of layers to maximize the light modulation. It also features a polymer composite or polymer-network stabilized cholesteric liquid crystal with electrically switchable Bragg reflected wavelength within a predetermined range of spectral wavelength.

24 Claims, 12 Drawing Sheets
(1 of 12 Drawing Sheet(s) Filed in Color)

(a)

(b)

(a)

(b)

CHOLESTERIC LIQUID CRYSTAL LIGHT MODULATORS

The present application claims priority from and the benefit of the filing date of Provisional Patent Application Nos. 60/836,093 and 60/836,094, both filed Aug. 7, 2006.

BACKGROUND

A cholesteric liquid crystal will adopt a helical structure with the director rotating around an axis perpendicular to the substrate surfaces in an electro-optical cell with homogeneous alignment. Because of the self-assembled helical structure of cholesteric liquid crystal, in the planar texture where cholesteric helix is aligned vertically, the incident light is decomposed into its right and left circular components with one component reflected and the other transmitted. The unique ability of a cholesteric liquid crystal to reflect light comes from their helical superstructure. The central reflected wavelength ($\lambda_o$) in a direction normal to the surface can be described as $\lambda_o = \bar{n} \cdot p = \bar{n} \cdot (C \cdot HTP)^{-1}$, where p is the helical pitch, in which the director rotates 360 degree, $\bar{n}$ is the average refractive index of the liquid crystal, C is the concentration of chiral dopant and HTP is the helical twisting power of the chiral material. The bandwidth ($\Delta\lambda$) of the reflected light equals $\Delta n \lambda / \bar{n}$, where $\Delta n$ is the birefringence of liquid crystal and $\bar{n}$ is average of refractive index. A continuous tunable and electrically programmable optical filter based on cholesteric liquid crystal can be fabricated for filtering different spatial wavelength. The bandpass filters can achieve 100% transmission or reflection when a combination of two cholesteric filters with the same reflection wavelength and opposite handedness are stacked.

When the helical pitch of a cholesteric liquid crystal is adjusted to Bragg reflect in the visible spectrum, it reflects an iridescent color. Depending on the magnitude of an applied voltage, the cholesteric liquid crystal in an electro-optical cell can be switched to different optical states such as the planar to focal conic and planar to homeotropic in which the incident light is weakly scatted or totally transmitted, respectively. The cholesteric cell displays an image which can remain on a display permanently without an applied voltage. This memory phenomenon can be achieved either by using surface treatment or polymer stabilization, as detailed, e.g. in U.S. Pat. Nos. 5,437,811, 5,691,795 and 5,695,682

For example, in responding to an applied low voltage, a liquid crystal with positive dielectric anisotropy initially with a planar texture is transformed into the focal conic texture. The focal conic state is stable at zero voltage. Even the gray levels can be stable such that a display which has a combination of planar and focal conic will maintain that particular combination and hence level of reflectivity over an indefinite period of time. When the applied voltage is above the threshold necessary for unwinding the helix, the cholesteric liquid crystal is transformed into one with a homeotropic texture where ambient light is totally transmitted and the cells appears transparent. The homeotropic state reverts back to the initial planar state upon the quick removal of the applied voltage. When the surface of the back panel is painted black, both the focal conic texture and homeotropic states appear black. The color reflective planar texture and the transparent focal conic texture can be stable over a sufficiently long period of time such that an image can be addressed on a high resolution matrix display and the image will remain on the display after the voltage is removed.

A multicolor cholesteric display was first introduced by using a color pixelation technique with a combination of photo illumination tuned chiral material to adjust the helical pitch in the exposed regions to produce red, green and blue colors as seen in U.S. Pat. No. 5,668,614. While the feasibility has been demonstrated, there is a loss in reflective brightness. Another color reflective display technology was introduced shortly using vertical stacked RGB panels to achieve the multicolor and enhance the reflectivity. The brightness of the color panel is maximized by using a combination of left and right-handed circularly polarized cholesteric material in different panels. A full color cholesteric display with reflectivity exceeds 50% of the ambient incident light was reported in U.S. Pat. No. 6,654,080. The bottleneck for the full color cholesteric displays to be realized commercially resides in the production yield and cost. For example, to display a full color image it requires three color cholesteric films and electronic drivers which increase the cost of the display. Furthermore, the shift register of pixels from separate panels causes parallax problem. Parallax demands that the thickness of the stacked layers be thinner than the pixel size. As a result, the yield in producing full color displays is low because of complexity in manufacturing process.

An alternative method to produce full color reflective cholesteric display involves the use of electrically tunable color technology. It is not anticipated that the focal conic state be used in which the switched color requires the voltage to remain on to display the desired color. The electric-field induced color change in cholesteric liquid crystals color can be traced back to the 1960's. Because the relationship of $\lambda_o = \bar{n}\ p\ \cos\ \theta$, the increase in tilt angle of cholesteric helix observed 15° from normal to the surface in response to applied voltage results in a smaller cholesteric pitch and thus, the spectral wavelength is blue shifted. Pitch dilation in cholesteric liquid crystal in which the color changes from blue to red with an increase in an applied field has been noted. In general, the cholesteric liquid crystal response to applied voltage by the rotation of the cholesteric helix away from normal direction of substrate surface. Without strong surface anchoring, there are insufficient cholesteric pitches to reflect incoming light in the normal direction. Consequently, these methods yield low reflectivity and short spectrum tuning range.

Another electrically-tuned color technology utilizes a display with in-plane inter-digitized electrodes configured on one surface and only LC alignment layer on the other surface without electrode as described in U.S. Pat. No. 6,630,982. The device enables an inhomogeneous distribution of electric field across the cell thickness and unwinds and elongates the cholesteric helix when an appropriate voltage is applied to the inter-digitized electrodes. Using a positive dielectric anisotropy cholesteric, the cholesteric pitch is extended with the increase in applied voltage. To achieve high reflectivity for each switched color, this display requires a thick cell. As a consequence, high switching voltage and slow response time are major challenges associated with the in-plane switched color technique.

The use of gel to preserve the polymer structure and uniform distribution of polymer within the cell has been reported. With a polymer consisting of mesogenic diacrylate and monoacrylate, the gel enables a shift in reflection band to low wavelength with increasing voltage, which was associated with the tilting of the cholesteric helix. In a second case, with a chiral monoacrylate additive, the reflection band is not shifted but reduces the reflectivity with increasing voltage, which is associated with Helfrich deformation following unwinding the helices. The negative aspects include broadening of reflective bandwidth and low reflectivity. The use electrical-field induced color change in cholesteric liquid crystal has been described using Helfrich deformation. The field-induced change in optical property of the cholesteric reactive mesogen is photopolymerized and fixed on a polymer film by masked curing the cholesteric reactive mesogen at different voltages. The negative aspects of this approach are a multicolor static film with loss of reflectivity at normal direction and broadening of spectral wavelength.

It would therefore desirable to provide a technique for fabricating cholesteric liquid crystal light modulating devices in which the spectral wavelength can be electrically switched, and for displays with all of the mentioned benefits, which can be practically implemented.

BRIEF SUMMARY

This present embodiments provide a method of fabricating liquid crystal light modulating devices comprising a cholesteric liquid crystal. In general, the present invention provides a method for fabricating light modulating devices, comprising a pair of substrates with transparent conductive electrodes, providing alignment layers for planar alignment, and depositing a cholesteric liquid crystal between the substrates. The cholesteric liquid crystal forms a planar texture with an alignment layer providing strong surface anchoring for liquid crystal molecules. And more particularly, it provides a cholesteric liquid crystal light modulating device whose spectral wavelength is electrically tunable. The cholesteric liquid crystal may include a heterogeneous species to enhance its reflectivity.

Another objective of the present invention is to provide a method of fabricating liquid crystal light modulating devices with an electrically tunable spectral wavelength comprising a polymer or polymer-network stabilized cholesteric liquid crystal. The liquid crystal layer can include a phase-separated polymer in which liquid crystal may be in the form of droplets or a polymer network homogeneously or in-homogeneously distributed between the substrates. The polymer or polymer network may be linked to the two substrate surfaces. More preferably, the polymer or polymer network is inhomogeneously distributed between the substrates or localized at the surface of a substrate.

At least one or more of the foregoing aspects, together with the advantages thereof over the known art relating to liquid crystal displays, are accomplished by the invention as herein after described and claimed. The phase-separated polymer or polymer network in cholesteric liquid crystal may be induced by polymerization, solvent evaporation or heat. Furthermore, this invention provides a method of fabricating full color reflective cholesteric displays using single panel. The device can also be built on substrates that are flexible and with a patterned wall structure to provide physical support to the substrates against external stress and mechanical shock. These patterned wall structures include but not limited to substrates with grooved structure, patterned polymer walls, polymer cups and polymer dispersed liquid crystal structures where high polymer content will enhance the structural stability.

Another embodiment of the invention features a continuous tuning of pre-selected Bragg reflection wavelength of the cholesteric liquid crystal which is subject to the amplitude and frequency of applied electric field through the cell gap. As used herein the spectral wavelength should be understood to mean a pre-selected Bragg reflection band of a cholesteric liquid crystal. The stability of the color reflective planar texture as well as the focal-conic transparent texture in a cholesteric display can be adjusted to reflect different colors in a display cell by an applied electric field.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE EMBODIMENTS

The present embodiments are directed to converting a cholesteric liquid crystal with a pre-selected reflective wavelength to Bragg reflect a different wavelength using an applied voltage without A decrease in brightness of the reflected color.

Figure 1:
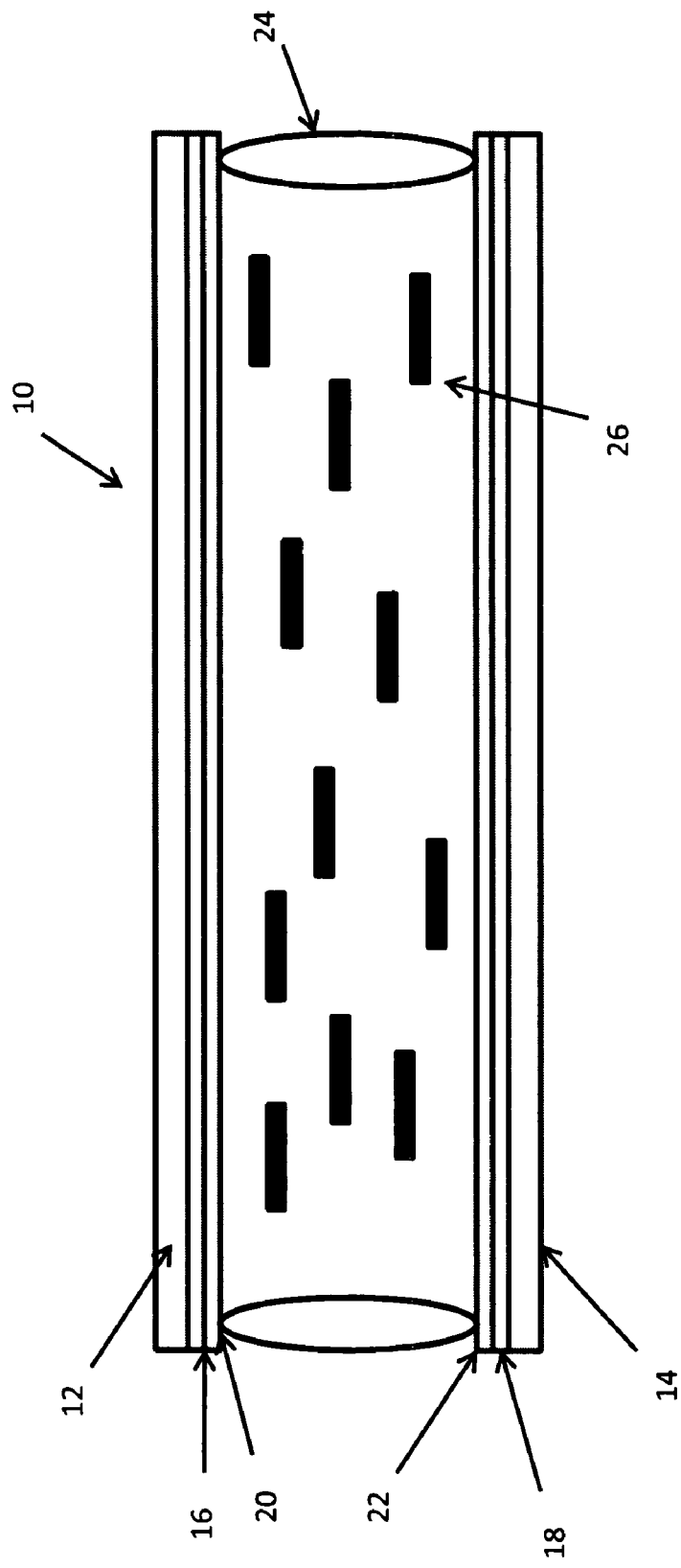
FIG. 1 is an electro-optical cell in accordance with one embodiment of the present invention.

In accordance with one embodiment and with reference to FIG. 1 an electro-optical cell is provided 10 having a pair of substrates 12, 14 with conductive electrodes 16, 18 coated on opposite faces thereof. The electrodes may be thin films of metal oxide or conductive polymers, with the conductors facing the interior of the cell. Alignment layers 20, 22 may be coated on the electrodes with the alignment layers rubbed in a uniaxial direction. The substrates are assembled in a fashion to form a cell with homogeneous, twisted, high pretilt or vertical alignment. In between the substrates, spacers 24 with desired size (e.g., 10 micron glass rods) may be randomly distributed to control the cell gap. A cholesteric liquid crystal material 26 is disposed in between the substrates.

Suitable cholesteric liquid crystals for use in the present embodiments include those that can be made by combining a nematic or ferroelectric liquid crystal and a chiral dopant. Examples of a suitable cholesteric liquid crystal include those that can be made by mixing 40-99.9% of a commercially available nematic liquid crystal and 0.1-60% of a dopant.

An exemplary cholesteric liquid crystal for use herein may be made by mixing 60-20% of a nematic LC E44 (Merck) and 40-80% of chiral dopant CB15 (Merck). At planar texture, the helix is aligned perpendicular to the substrates and the Bragg reflection wavelength, $\lambda_o$, of the cholesteric liquid crystal is between 630 to 695 nm and has a bandwidth about 100 nm determined by using a spectrometer.

Figure 2:
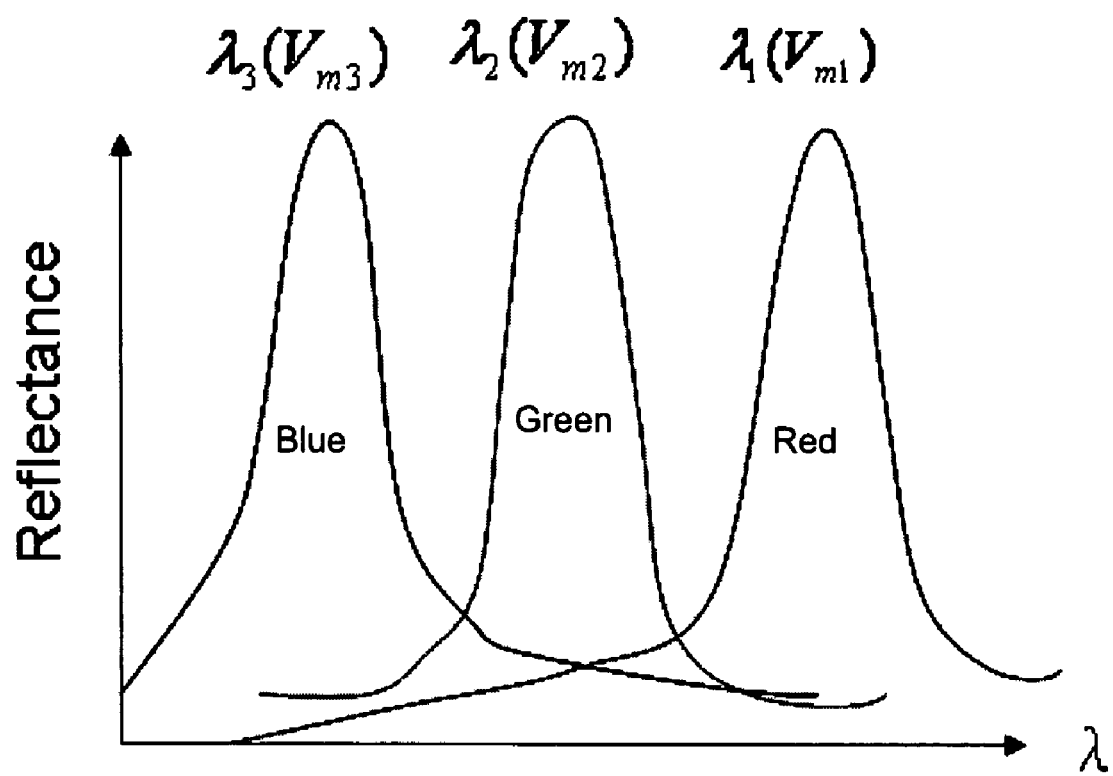
FIG. 2 is a graphic diagram of optical states changes of a cholesteric liquid crystal cell having an electrically switchable reflective spectral wavelength as a function of applied voltage.

As can be seen in FIG. 2, the change in reflected spectral wavelength from a cholesteric liquid crystal, also referred to as Bragg reflection, can be controlled through the manipulation of the magnitude and frequency of an applied voltage. The liquid crystal molecules at the boundary are aligned and strongly anchored by the surface alignment layers so that the cholesteric helix is initially aligned perpendicular to the substrates at zero applied voltage. In this state, the cholesteric liquid crystals reflect a pre-selected wavelength. Upon the application of a small bias field in a direction parallel to the helical axes, the liquid crystal molecules in the bulk are reoriented in the direction parallel to the field direction and the pitches are extended or unwound. However, the boundary pitches are the least disturbed by the applied electric field and remain in the planar state because of the strong anchoring at the substrates. In response to the applied voltage, the liquid crystal molecules in the bulk are extended and start to compress the pitches near the boundary layers so the pitches near the boundary layers are shortened. Therefore, the center wavelength, measured normal to the substrate and at in the same direction as the illuminating light, is blue-shifted in response to the shortened helical pitch.

Figure 3:
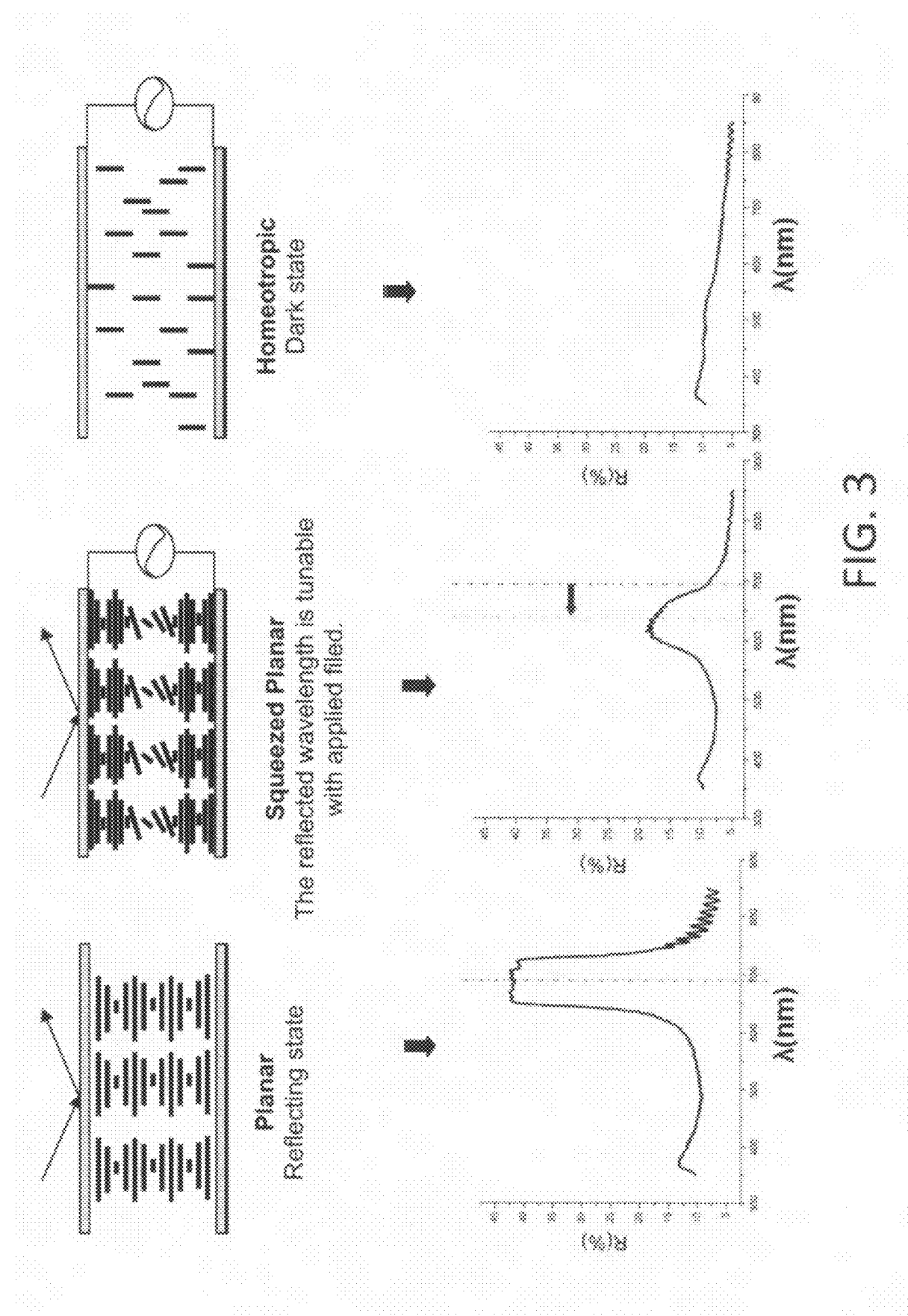
FIG. 3 is a perspective view illustrating the re-orientation of cholesteric helix orientation in response to an applied voltage of a surface-stabilized cholesteric liquid crystal cell: (a) planar reflective state at zero voltage, (b) helices of at middle layers unwind and compress the boundary layers at an applied voltage, and (c) helices completely unwind as the voltage exceeds the critical field.

The reflectivity and spectral wavelength of the planar states (bright state) of a cell at zero voltage and applied voltage as well as the homeotropic (dark state) at a voltage larger than the critical voltage with a planar alignment are shown in FIG. 3. The change in the electrically switched spectral wavelength of a cholesteric liquid crystal depends on the magnitude of an applied voltage and its frequency. The uniaxially rubbed surface alignment layers provide cholesteric helices oriented perpendicular to the substrates at the zero voltage. Under strong surface anchoring condition, the applied voltage parallel to the substrates changes the cholesteric helix orientation in middle layers and compresses the boundary layers and thus, causes the blue shift in spectral wavelength. At the electric field near the critical field, $E_c=(\pi/p_o)\sqrt{4\pi k_{22}/\Delta\epsilon}$, where $p_o$ is the unperturbed pitch, $k_{22}$ is the twist elastic constant and $\Delta\epsilon$ is the dielectric anisotropy of the cholesteric. The cholesteric helices are unwound and the Bragg reflected wavelength reaches a minimal wavelength. In the meantime the reflectivity reaches a minimum because the reflectance no longer depends on the index of refraction.

EXAMPLES

Figure 4:
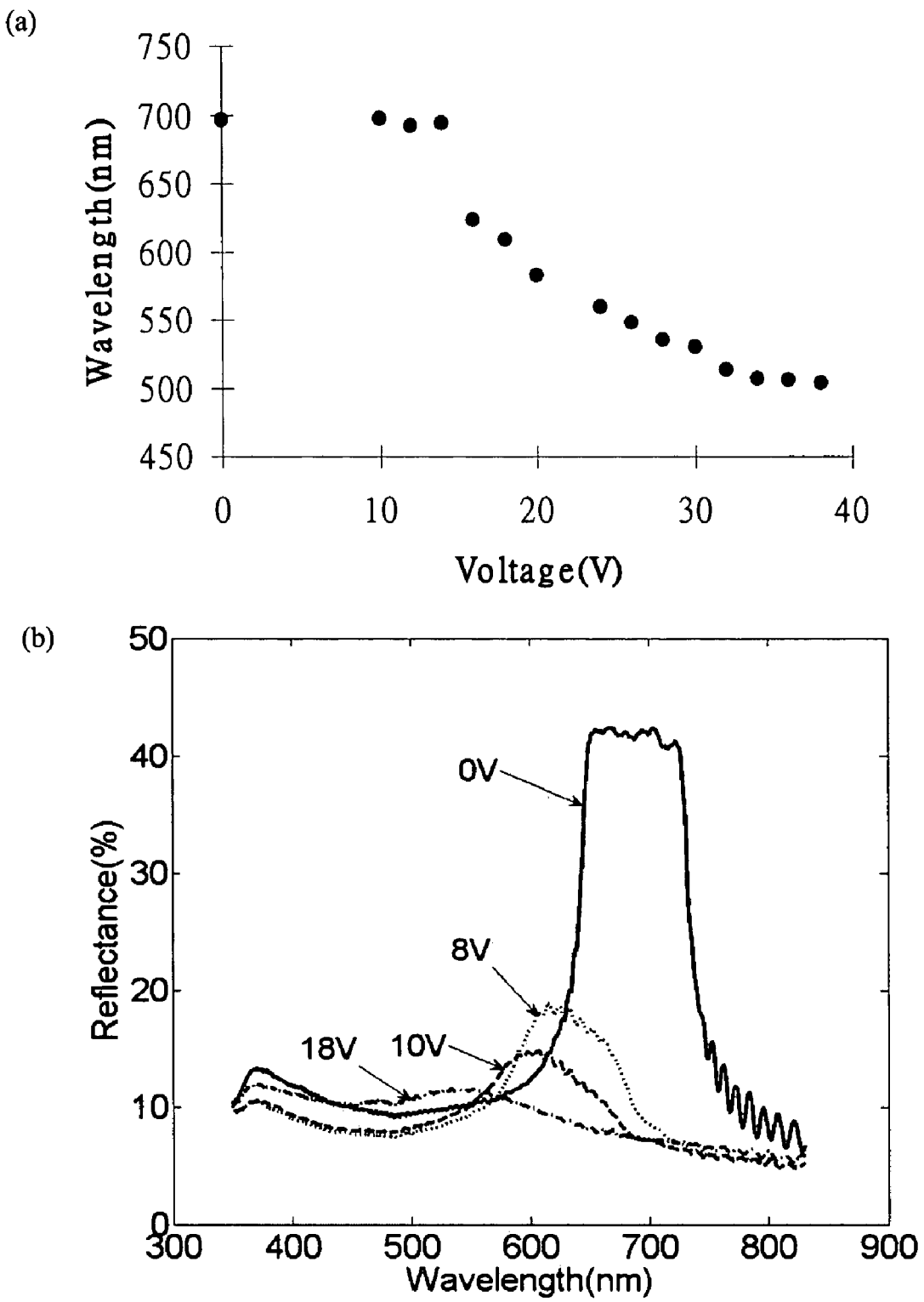
FIG. 4 is a graphic illustration of (a) reflected wavelengths versus applied voltages and (b) the reflectance and spectra wavelength shift as a function of applied voltage.

As shown in FIG. 4, a field-induced blue shift in cholesteric liquid crystal is illustrated wherein the reflected wavelength is a function of applied voltage (a) and the reflectivity is a function of switched spectral wavelength (b). The reflective wavelength of the cholesteric liquid crystal is 695 nm with 45% reflectivity at zero voltage. As the voltage exceeds 15V, the pitches in the bulk are deformed by the voltage because of weak anchoring and thus, the pitches in the middle layers are extended. Consequently, the liquid crystal molecules in the bulk start to compress the pitches near the boundary layers so the pitches near the boundary layers are shortened. The spectral wavelength is switched to reflect a red at 16V with 25% reflectivity, green at 25V with 15% reflectivity and blue color at 40V with 12.5% reflectivity. Because the oriented liquid crystal molecules are no longer in a planar structure, the number of layers contributing to the reflectance decreases. Therefore, as it is shown in FIG. 4, the reflectance is significantly decreased with increasing in voltage.

Figure 5A:
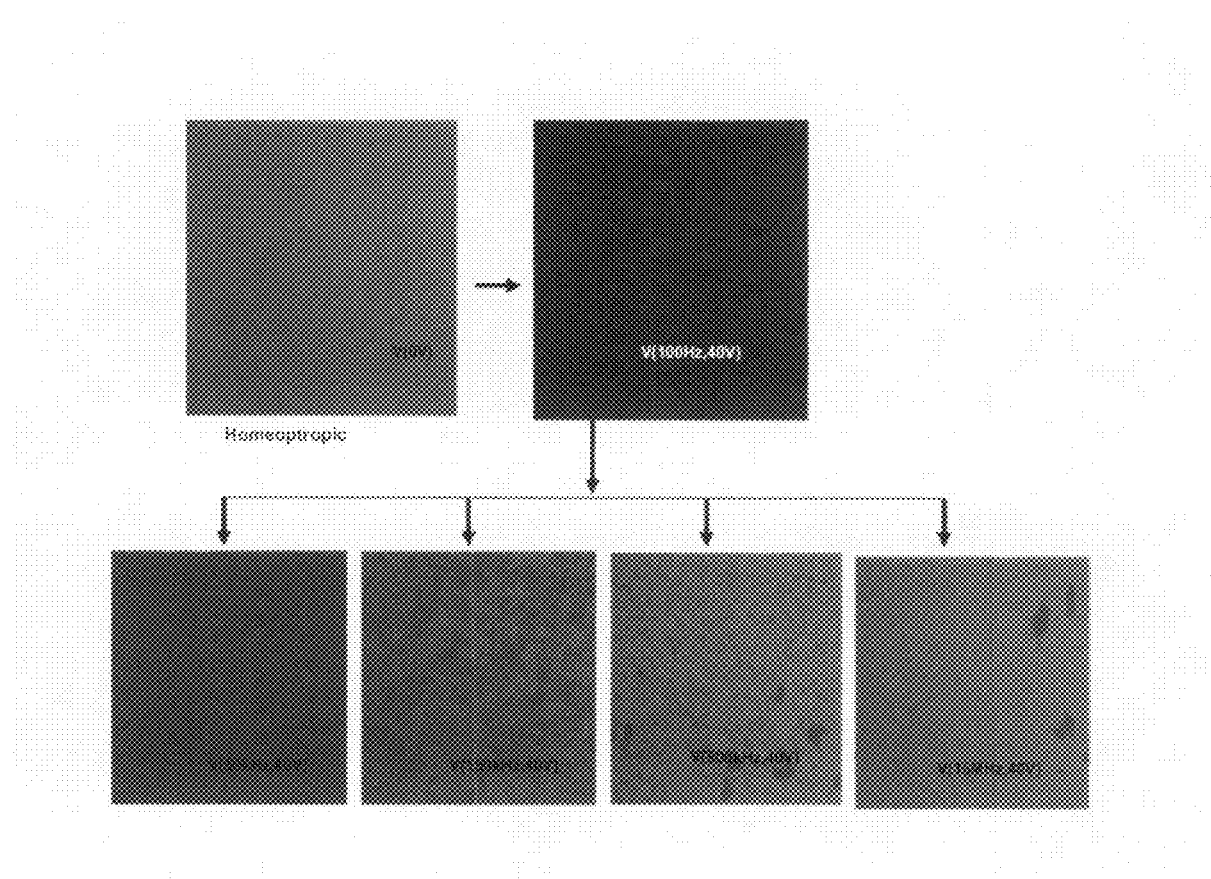
FIG. 5a are photomicrographs of frequency modulation of reflected colors switched from orange at 0V to black at 40V of 100 Hz; the blue, green, orange-red and red colors are obtained at 50 KHz, 150 KHz, 500 KHz, and 50 MHz, respectively.

The frequency tuned spectral wavelength in cholesteric materials can also be prepared from chiral additive doped nematic liquid crystal having negative dielectric anisotropy or ferroelectric liquid crystal that is known for possessing a negative dielectric anisotropy. An exemplary cholesteric liquid crystal is prepared by mixing 54.0% of a nematic E44 (Merck) and 46.0% of chiral dopant CB15. The mixture and 16.47% of CS 2005 (Chisso, Japan) based on the cholesteric mixture (E44 and C15) is disposed in a cell. The cell had alignment layers for homogeneous alignment and cell gap was separated by 4 micron spacers deposited between the substrates. The device of present invention enables the frequency modulation of spectral wavelength at voltage that switches the cholesteric to a homeotropic state. In accordance with FIG. 5a initially, the 10 micron cell reflects an orange color at zero voltage. Upon the application of 40V at 100 Hz the cell is switched from planar texture to homeotropic texture, which appears black viewed between the crossed polarizers. The cell appears a number of different colors including blue, green, orange and red in responding to the frequency modulation increasing from 100 Hz to 50 KHz, 150 KHz, 500 KHz and 15 MHz, respectively. The time required for the cholesteric helical axes to relax back to the planar texture is both frequency and voltage dependent and is in the range from hundreds of milliseconds to several seconds. This may be because of flow from the unaligned cholesteric helices in the bulk.

Another embodiment of the present invention is directed to the use of a dual-frequency switchable liquid crystal MLC2048. An operable mixture contains 67.20% of MLC2048 and 32.77% CB15. In a condition of constant frequency, if a voltage larger than the critical voltage is applied across the cell, the liquid crystal molecules will be aligned along with the field that the material is in the homeotropic state. The material will switch to the planar texture if the field is turned off quickly. If the voltage applied to the material with homeotropic textures drops to an intermediate voltage between $V_F$ and $V_H$, it will switch to focal conic state. In a condition of constant frequency, if a sufficiently high voltage ($V>V_H$) is applied across the cell, the liquid crystal molecules will be aligned along with the field that the material is in the homeotropic state. The material will switch to the planar texture if the field is turned off quickly. If the voltage applied to the material with homeotropic textures drops to an intermediate voltage between $V_F$ and $V_H$, it will switch to focal conic state. In addition to obtaining transitions among cholesteric textures by amplitude modulation, it is possible to switch different textures with frequency modulation. The material will switch from a homeotropic texture to a focal conic texture by increasing the frequency while maintaining a sufficiently high voltage. Either in a focal conic or homeotropic texture, the material will return to a planar state when an extremely high frequency is supplied.

Figure 5B:
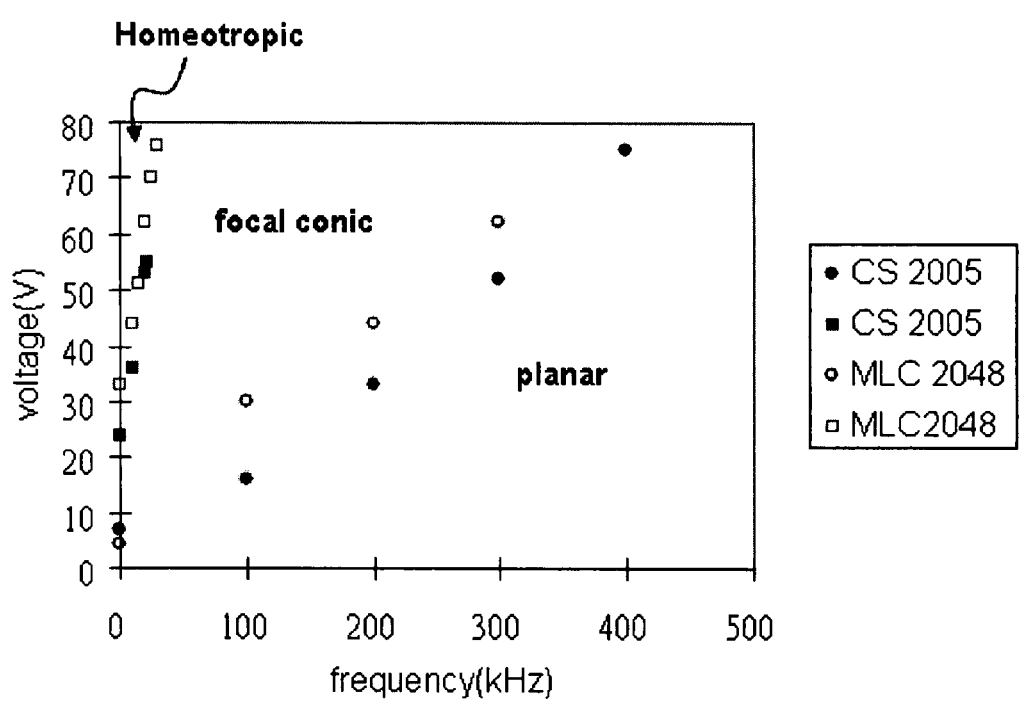
FIG. 5b is a graphic illustration of transition changes in a display cell as a function of voltage and frequency.

FIG. 5b shows graphic illustration of texture of display cells filled with CS2005 and MLC2048 under both voltage and frequency modulation. The squares show the critical voltage at a certain frequency, in which the transition from homeotropic to focal conic structure occurs. The circles represent the transition from planar to focal conic texture when slowly decreasing voltage at a fixed frequency or decreasing frequency at a fixed voltage. Cholesteric liquid crystals which use MLC2048 as nematic host shows a lower frequency threshold comparing to Cholesteric liquid crystals doped with CS2005.

The direction of spontaneous polarization of a fluid liquid crystal aligned in the direction of an external field is dependent on the pitch of the mixture. The cholesteric material may be switched from a homeotropic texture to a focal conic texture by increasing the frequency at a high voltage that unwinds the cholesteric helix. At a constant voltage the cholesteric material is switched to a planar texture by increasing the frequency when the cholesteric is in a homeotropic state. Either in a focal conic or homeotropic texture, the cholesteric material will return to a planar state when an extremely high frequency is supplied.

Polymer Stabilization

Figure 6:
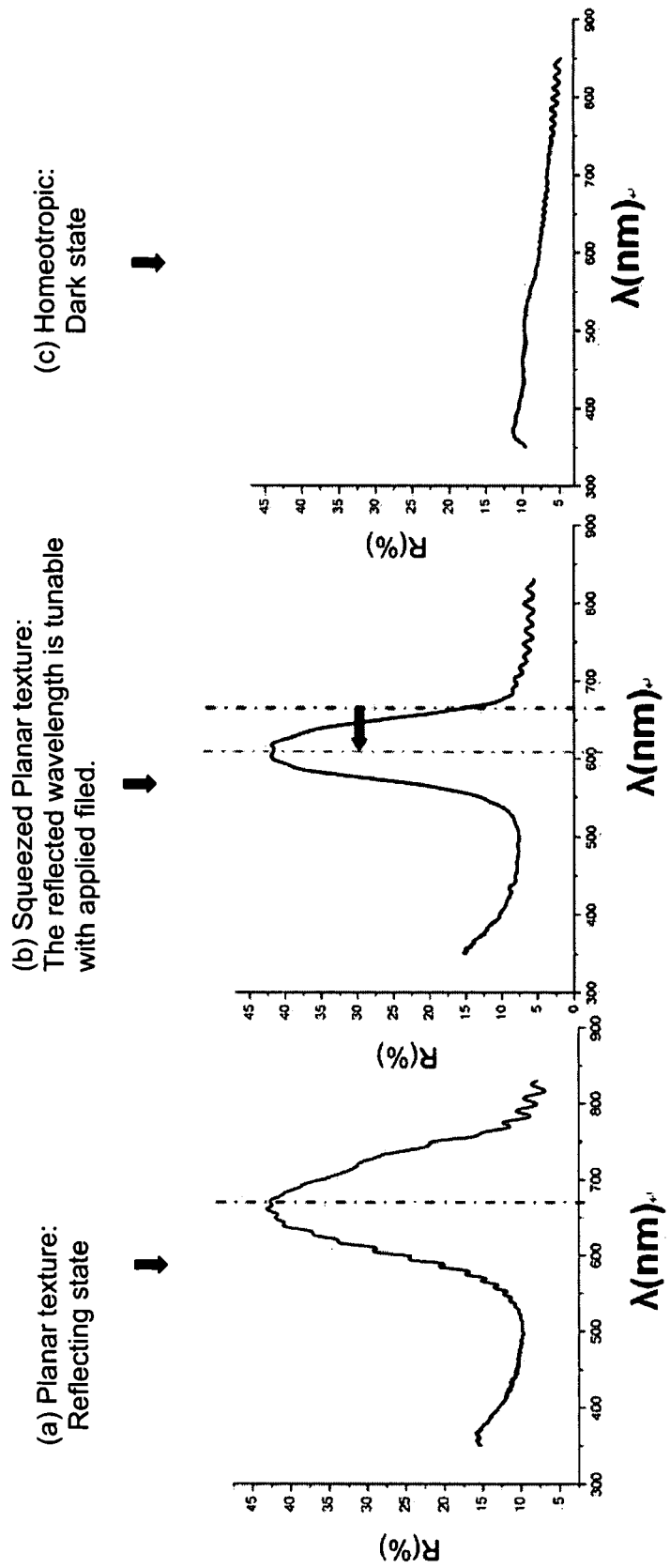
FIG. 6 is a perspective view illustrating the re-orientation of cholesteric helix orientation in response to an applied voltage of a polymer-stabilized cholesteric liquid crystal cell: (a) planar reflective state at zero voltage, (b) helices of middle layers unwind and compress the boundary layers at an applied voltage, and (c) helices completely unwind as the voltage exceeds the critical field.

In order to maximize the reflectance of each tuned color, the performance of the display may be improved by sacrificing the bistability in favor of full color reflective display using a polymer stabilization technique. A low concentration of polymer network is introduced to stabilize cholesteric helices in a planar state to avoid the significant decrease in reflectance with increasing voltage. To demonstrate the effectiveness of the electrically tunable spectral wavelength, an operable cell comprising of indium tin oxide coated substrates, a polyimide layer for inducing planar alignment, 10-micron glass spacers for cell gap control is filled with a small amount of phase-separated polymer network and a cholesteric liquid crystal with a pre-selected reflected wavelength of 690 nm at zero voltage. As illustrated in FIG. 6, with increasing voltage, the liquid crystal molecules in the bulk start to compress the pitches near the boundary layers so the pitches near the boundary layers are shortened. Therefore, the center wavelength of the reflected light is blue-shifted in corresponding to a shortened cholesteric pitch. Nevertheless, with the assistance of polymer network, the pitches at the surface boundary are least distressed by the electric field and are stabilized at the planar state. As the field is further increased, the unwinding helices results in the minimum reflectivity because the reflectance no longer depends on the index of refraction.

Figure 7:
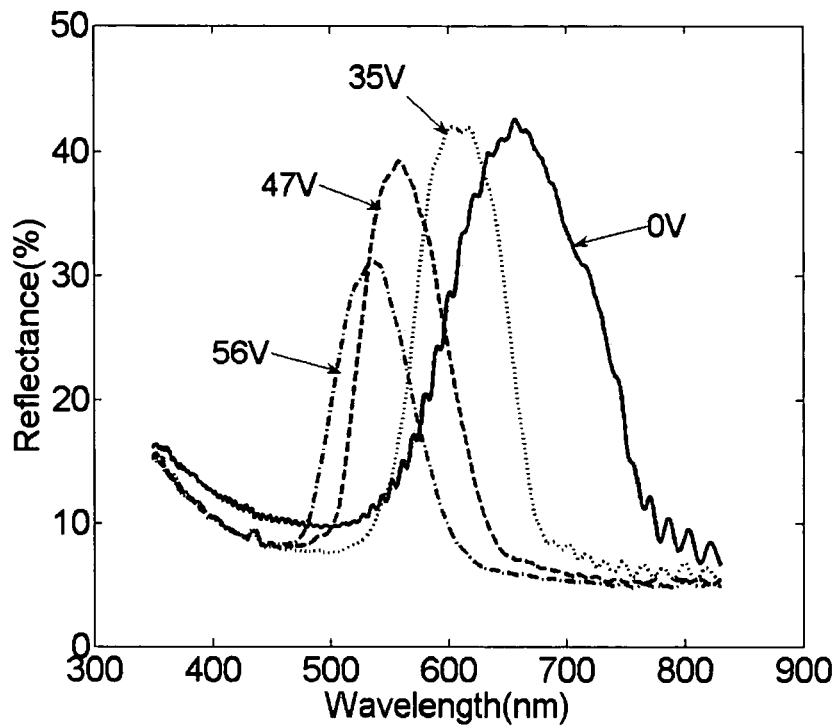
FIG. 7 is a graphic illustration of (a) the reflectance and spectra wavelength shift as a function of applied voltage, and (b) a plot of reflected wavelengths versus applied voltages.
Figure 7:
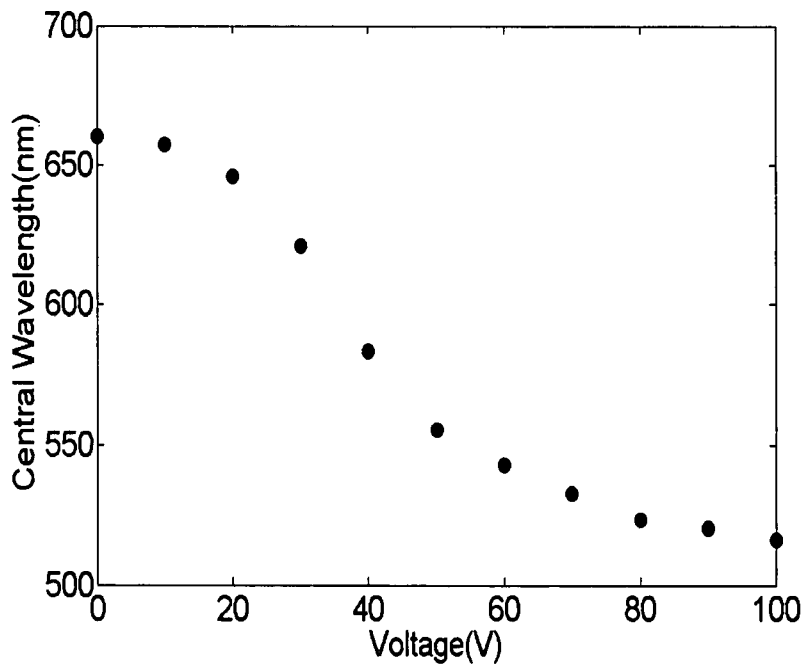

In another example of the present invention, a polymer stabilized cholesteric liquid crystal material comprising a nematic liquid crystal 67.20% E44, a chiral dopant 32.72% CB15, a reactive mesogen 5.0% RM257 (the above three all obtained from Merck) and 0.05% of Ir651 (a photoinitiator from Ciba Additive) is disposed in an electro-optical cell with 10 micron cell gap. The alignment layers are introduced to provide a cholesteric planar texture with the cholesteric helixes aligned perpendicular to the substrates. In referring to FIG. 7 before exposing the cell to UV light and at zero voltage, the cholesteric liquid crystal reflects at 694 nm with a bandwidth of 100 nm and 45% reflectivity determined by using a spectrometer. After UV exposure for 30 minutes, the cholesteric material exhibits a reflected wavelength of 663 nm with 45% reflectivity at zero voltage. The UV radiation causes phase-separated nematic reactive mesogen molecules to form a polymer network and increase of helical twisting power of the cholesteric host because of the increase with chiral dopant concentration in the mixture.

There are potentially many methods such as thermal, emulsion, solvent evaporation, etc. to induce the phase separated polymer network. The most contemplated method is the photopolymerization induced phase separated polymer network. As in FIG. 7, one can see the peak reflected wavelength can be shifted by as much as 135 nm and with half of the original reflectance at around 59V. The reflectance is lowered at high voltage near the critical field because LC molecules in the bulk are tilted so much, so they contribute fewer pitches to the reflectance. The reflected colors of red, green and blue green at applied voltage of 1 kHz square wave function are 0V with 45% reflectivity, 47V with 40% reflectivity and 59V with 27.5% reflectivity, respectively. This indicates the spectral wavelength of the system is electrically tunable.

Figure 8:
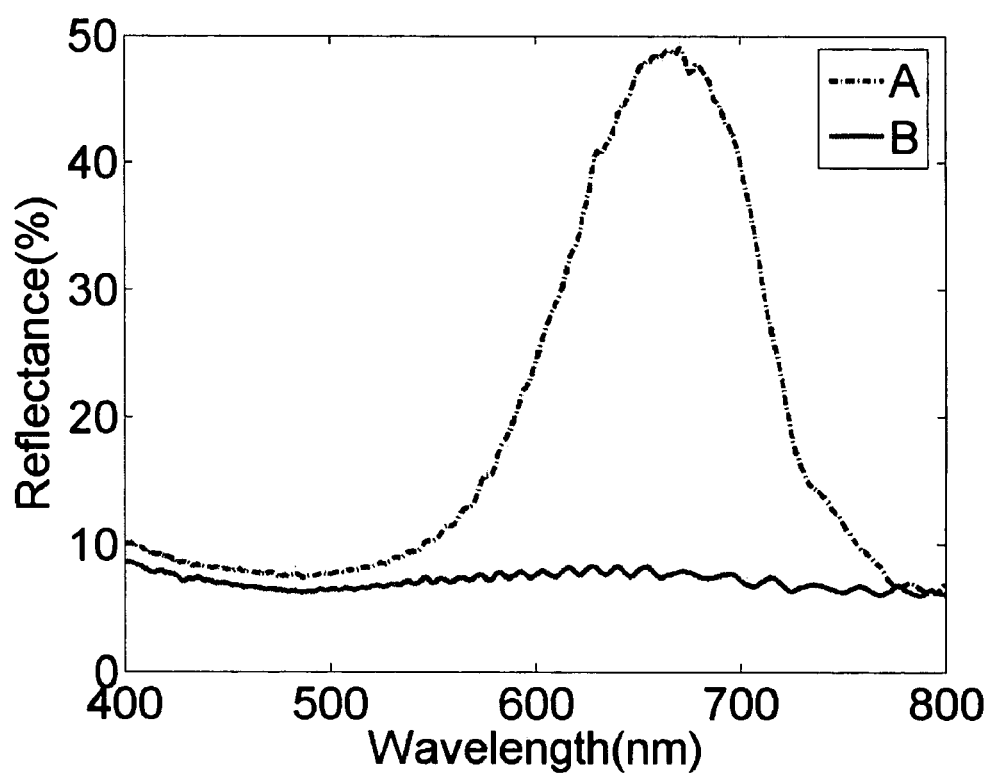
FIG. 8 is a graphic and pictorial view of (a) asymmetric modulation of spectral wavelength as a function of applied voltage, (b) the perspective view of light reflection and transmission properties of A side (the front side with respect to incident UV light), and (c) the perspective view of light reflection and transmission properties of B side (the rear side with respect to incident UV light).

As will be apparent to those of ordinary skill in the art in view of the disclosure, the polymer network may be presented in the display of this invention in the form of a heterogeneous structure in cholesteric liquid crystal. More preferably, the polymer network is inhomogeneously distributed, dispersed or localized on one of the substrate surfaces. As shown in FIG. 8, the polymer stabilized cholesteric cell exhibits an asymmetric reflectivity of the side A (side exposed to UV light) and side B (the side opposite to UV exposure). At zero applied field, the Bragg reflection of the polymer stabilized cholesteric cell is observed from side A, while the opposite side (side B) shows no reflection peak as also illustrated in FIG. 8. The asymmetric reflectivity is observed because photopolymerization at side A is faster than the side B glass substrate because of a fast phase separation process and thus, causes the unbalance localization of polymer network on one substrate than the other.

Figure 9:
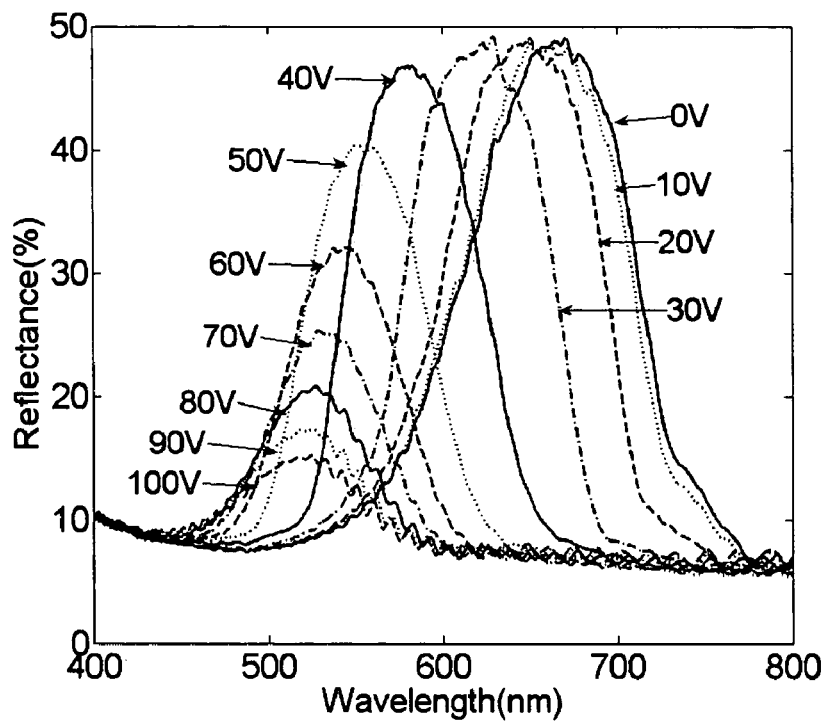
FIG. 9 is a graphical illustration of asymmetric modulation of spectral wavelength as a function of applied voltage from side A and side B.
Figure 9:
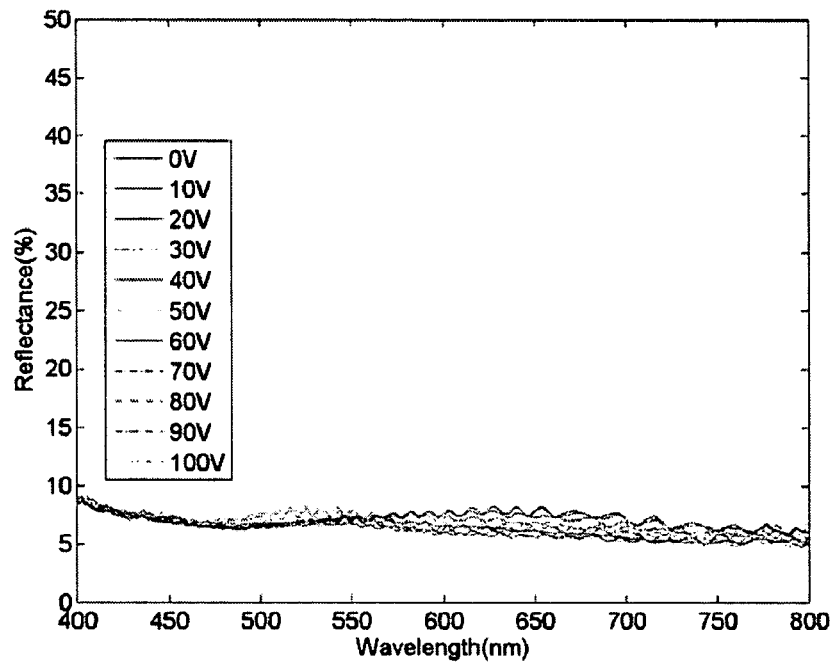

By varying the applied voltage from 0-100 V, the reflected central wavelength from side A is linearly tunable by a range as much as 140 nm as shown in FIG. 9a. In contrast, as illustrated in FIG. 9b, side B has no noticeable change in response to the applied voltage.

Figure 10A:
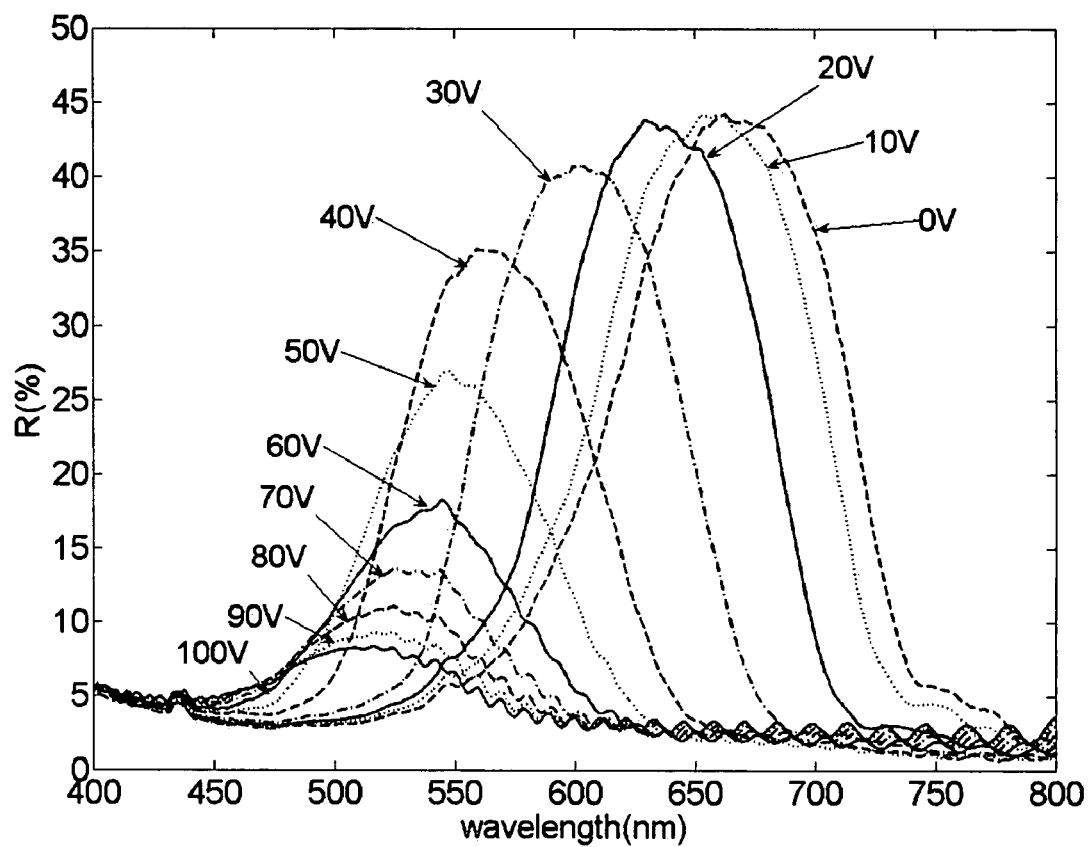
FIG. 10 is a graphical illustration of the effect of voltage modulation of spectral wavelength of a dye-doped polymer-network stabilized cholesteric cell showing (a) increase in applied voltage and (b) decrease in applied voltage.
Figure 10B:
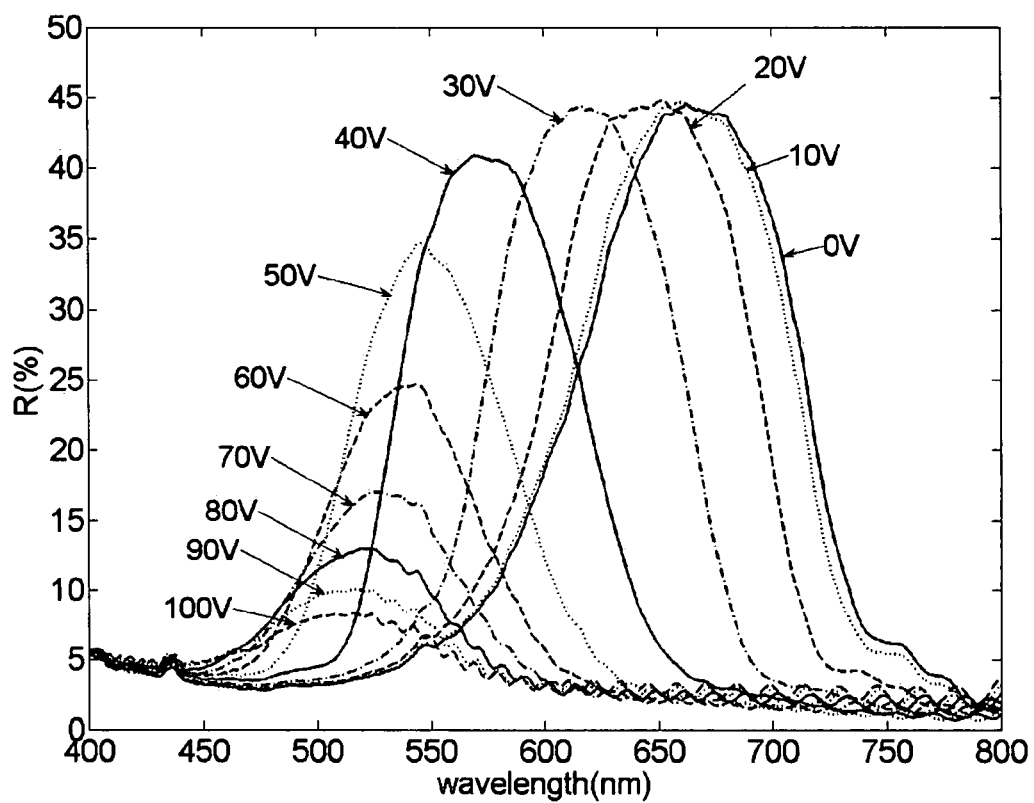

Another embodiment of the present invention includes a polymer stabilized cholesteric liquid crystal material comprising of a nematic liquid crystal 62.20% E44, a chiral dopant 32.72% CB15, a commercial small molecule dyes such as 0.5% of 4-(dicyanomethylene)-2-methyl-6-(4-dimethylaminostryl)-4H-pyran (DCM), a reactive mesogen 5% RM257 (the above three all obtained from Merck) and 0.05% of Ir651 (a photoinitiator from Ciba Additive) is disposed in an electro-optical cell with 10 micron cell gap. The alignment layers are introduced to provide a cholesteric planar texture with the cholesteric helixes aligned perpendicular to the substrates. In referring to FIG. 10(a), after UV exposure for 30 minutes, the cholesteric material exhibits a peak reflected wavelength of 695 nm with a half bandwidth of 250 nm at zero voltage. The broad bandwidth may be due to the misaligned cholesteric helices by the cell filling stage or gradient distribution of helical pitch in the cholesteric mixture. Further reference to FIG. 10(a), the display had a brightness of 45% and bandwidth gradually decreased to 100 nm at 45 V for the planar state. With reference to FIG. 10(b), the display regained brightness as the voltage was then reduced from 100V to 0V, and showed that the process was reversible. That is, at 100V the display brightness was 22.5% brightness at 490 nm. Upon the decrease in applied voltage, the display reclaimed the brightness and maintained 45% brightness with 100 nm bandwidth at 0V.

An operable cell filled with the same polymer stabilized cholesteric materials is prepared the same as that described above except with 20 micron cell gap. The driving voltage for the display enabled full visible spectrum tuning with a voltage over 100V with 45% brightness. An operable polymer stabilized cholesteric cell shows the capability of frequency modulation of spectral wavelength at an applied voltage.

An operable polymer stabilized cholesteric cell shows a good thermal stability in both heating and cooling process. Unlike the variation of pitch with temperature change in cholesteric liquid crystals, the cell with polymer network suppresses the pitch elongation as the temperature increased. The deviation in reflected wavelength from room temperature up to 60° C. is negligible. Moreover, the reflectivity maintain at the 45% reflectivity for a single cell. The decrease in reflected wavelength beyond 60° C. is because of the liquid crystal approaching the isotropic transition temperature, in which the extended helical pitches in mid layers compress those at the boundary layers.

In this specification and the appended claims, unless defined otherwise, all technical and scientific terms used herein have the same meaning for common understood to be one of the ordinary skill in the art to which this invention pertains. The "transmitted wavelength" and "reflective wavelength" refer to the components of spectral wavelength filtered by a cholesteric material with pre-selected reflective wavelength. It is also to be understood that within the scope of the appended claims, the invention can be practiced in other spectrums than those that have been specifically shown and described; for example, from ultraviolet to millimeter wavelength. It is also to be understood that within the scope of the appended claims, the invention can be practiced to achieve ultra high brightness by using a multilayered structure. Based on the forgoing disclosure, it should now be apparent that the LC devices of the present invention will carry the objects set forth hereinabove. It is, therefore, to be understood that any variations evident fall within the scope of the claimed invention and thus, the selection of specific component elements can be determined without departing from the spirit the invention herein disclosed and described.

What is claimed is:

1. A method comprising:
   providing a pair of opposed substrates to form a cell;
   providing conductive electrodes disposed on facing surfaces of said substrates;
   providing alignment layers on facing surfaces of the conductive electrodes;
   disposing a material comprising a cholesteric liquid crystal into said cell, the cholesteric liquid crystal having a cholesteric helix at zero bias effective to define a Bragg reflective wavelength, wherein the cholesteric liquid crystal has helixes aligned perpendicular to the substrates at zero applied voltage; and
   selectively changing said Bragg reflective wavelength amongst at least four different selectable Bragg reflective wavelengths by applying a selected one of at least four different corresponding voltages to said cell via said conductive electrodes, the applied voltage being selected to decrease the Bragg reflective wavelength by a selected amount.

2. The method of claim 1 wherein the reflective wavelength from said cell may be varied as a function of the magnitude and/or the frequency of a voltage applied to said cell.

3. The method of claim 1, wherein the cholesteric liquid crystal includes a heterogeneous species to enhance reflectivity of the cholesteric liquid crystal.

4. The method of claim 1, wherein the cholesteric liquid crystal comprises a nematic liquid crystal and a chiral dopant.

5. The method of claim 1, wherein the disposing further comprises:
   providing a polymer network stabilizing cholesteric helices of the cholesteric liquid crystal in a planar state and having a low concentration effective to prevent a decrease in reflectance of more than one-half during the changing of said Bragg wavelength.

6. The method of claim 5, wherein the polymer is in the form of a phase separated polymer network.

7. The method of claim 6, wherein the providing a polymer network comprises:
   inducing the phase-separated polymer or polymer network by solvent evaporation, or heat.

8. The method of claim 6, wherein the polymer network is localized on one of said first and second substrates such that said device exhibits asymmetric reflectivity, wherein color is reflective when viewed on one side of said device and not reflective when viewed on an opposite side.

9. The method of claim 6, wherein the polymer or polymer network is anchored to at least one of said substrates.

10. A light modulating device comprising:
    an electro-optical cell comprising electrically tuned color pixels, said cell comprising first and second substrates, an alignment layer disposed on said substrates, and a liquid crystal material comprising a cholesteric liquid crystal disposed in said cell and a polymer network stabilizing the cholesteric helices in a planar state at zero bias, wherein said cholesteric liquid crystal exhibits a reflection having a Bragg reflective wavelength; and
    electrical biasing circuitry including at least first and second electrodes disposed on facing surfaces of said first and second substrates configured to apply a bias field effective to change said Bragg reflective wavelength as a function of a voltage of said bias field applied to said cell causing the wavelength of said reflection from said cell to be varied, the electrical biasing circuitry configured to apply said bias field over an operative range of bias fields effective to vary the Bragg reflective wavelength over a wavelength range of at least 135 nm.

11. The light modulating device of claim 10, wherein the reflected color from the electro-optical cell can be varied as a function of the magnitude and/or frequency of a voltage applied to said cell.

12. The light modulating device of claim 10, wherein the wavelength and intensity said reflection from said cell can be changed by altering at least one of the magnitude and frequency of said voltage.

13. The light modulating device of claim 10, wherein said device is a single-panel color display.

14. The light modulating device of claim 13, wherein the display comprises flexible substrates with a patterned structure to provide physical support to the substrates.

15. The light modulating device of claim 14, wherein said patterned structure comprises at least one of a grooved structure, patterned polymer walls, polymer cups or polymer dispersed liquid crystal structures.

16. The light modulating device of claim 10, wherein the polymer network is inhomogenously distributed in said cell.

17. A method comprising:
    providing a light modulating device including a pair of opposed substrates forming a cell, conductive electrodes disposed on facing surfaces of the substrates, a cholesteric liquid crystal disposed in the cell and having cholesteric helices at zero bias effective to define a zero bias Bragg reflective wavelength, and a polymer network stabilizing the cholesteric helices in a planar state at zero bias, the light modulating device having a zero bias reflectance at the zero bias Bragg reflective wavelength; and operating the light modulating device to reflect light at an operating Bragg reflective wavelength smaller than the zero bias Bragg reflective wavelength by applying a selected operating bias to the cell via the conductive electrodes, the light modulating device having a reflectance at the selected operating bias and at the operating Bragg reflective wavelength that is at least half of the zero bias reflectance.

18. The method as set forth in claim 17, wherein the operating comprises:

operating the light modulating device to reflect light at an operating Bragg reflective wavelength that is at least 100 nm smaller than the zero bias Bragg reflective wavelength.

19. The method as set forth in claim 17, wherein the operating comprises:

operating the light modulating device to reflect light at an operating Bragg reflective wavelength that is at least 135 nm smaller than the zero bias Bragg reflective wavelength.

20. The method as set forth in claim 17, wherein the light modulating device is not a bistable light modulating device.

21. The method as set forth in claim 17, wherein the polymer network stabilizes the zero bias reflectance at least between room temperature and 60° C.

22. The light modulating device of claim 10, wherein the operative range of bias fields does not include a bias field inducing a homeotropic dark state in the electro-optical cell.

23. The light modulating device of claim 10, wherein over the operative range of bias fields reflectance does not decrease below one-half of the reflectance at zero bias.

24. The light modulating device of claim 10, wherein the polymer network is localized on one of said first and second substrates such that said device exhibits asymmetric reflectivity, wherein the device exhibits the reflection having a Bragg reflective wavelength when viewed on one side of said device but does not exhibit the reflection having a Bragg reflective wavelength when viewed on an opposite side.

* * * * *